United States Patent
Hyodo et al.

(10) Patent No.: US 8,671,673 B2
(45) Date of Patent: Mar. 18, 2014

(54) TRAVEL CONTROL APPARATUS FOR WORKING VEHICLE

(75) Inventors: Koji Hyodo, Kasumigaura (JP); Kazuo Chonan, Moriya (JP); Yasuo Yamazaki, Ryugasaki (JP); Nobuhiro Suzuki, Ryugasaki (JP); Koji Takano, Tsukuba (JP); Genichiro Ishimaru, Inashiki (JP); Nobuyuki Hidaka, Kasumigaura (JP); Masaki Yoshikawa, Kasama (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 1076 days.

(21) Appl. No.: 12/530,987

(22) PCT Filed: Mar. 12, 2008

(86) PCT No.: PCT/JP2008/054519
§ 371 (c)(1),
(2), (4) Date: Sep. 11, 2009

(87) PCT Pub. No.: WO2008/120545
PCT Pub. Date: Oct. 9, 2008

(65) Prior Publication Data
US 2010/0095663 A1      Apr. 22, 2010

(30) Foreign Application Priority Data
Mar. 12, 2007   (JP) .................................. 2007-061954

(51) Int. Cl.
    *F16D 31/02*     (2006.01)
(52) U.S. Cl.
    USPC .......................................................... 60/422
(58) Field of Classification Search
    USPC ................... 60/420, 443, 445, 490, 491, 422; 180/306
    See application file for complete search history.

(56) References Cited

U.S. PATENT DOCUMENTS

| | | | | |
|---|---|---|---|---|
| 4,189,920 A | * | 2/1980 | Dezelan | 60/420 |
| 4,191,017 A | * | 3/1980 | Dezelan | 60/420 |

(Continued)

FOREIGN PATENT DOCUMENTS

| | | |
|---|---|---|
| EP | 0 467 440 A1 | 1/1992 |
| EP | 1 911 953 A1 | 4/2008 |
| EP | 2 136 055 A1 | 12/2009 |

(Continued)

OTHER PUBLICATIONS

JP 5106245 Full Contents translation (Claims, detailed descrition of the invention, brief description of the drawings, explanation of letters of numerals), Year:1993.*

(Continued)

*Primary Examiner* — Edward Look
*Assistant Examiner* — Michael Quandt
(74) *Attorney, Agent, or Firm* — Crowell & Moring LLP

(57) ABSTRACT

There are provided: a first circuit for traveling HC1, formed through a closed circuit connection of a variable displacement hydraulic pump 2 and a variable displacement hydraulic motor 3, that includes a motor control unit 10, 11 that controls a displacement of the hydraulic motor 3; a second circuit for working HC2 that drives a work hydraulic actuator 114, 115 by pressure oil from a work hydraulic pump 4; and a maximum value control unit that controls a maximum displacement of the hydraulic motor 3 in accordance with load pressure Pf in the second circuit HC2. The maximum value control unit decreases the maximum displacement to a minimum limit q1 corresponding to a maximum load pressure Pr in the second circuit when load pressure Pf in the second circuit exceeds a predetermined value Ps.

8 Claims, 12 Drawing Sheets

(56) References Cited

U.S. PATENT DOCUMENTS

| | | | |
|---|---|---|---|
| 5,030,177 A * | 7/1991 | Reed | 475/24 |
| 5,203,168 A * | 4/1993 | Oshina et al. | 60/426 |
| 5,560,447 A * | 10/1996 | Ishii et al. | 180/242 |
| 5,638,677 A * | 6/1997 | Hosono et al. | 60/431 |
| 6,202,411 B1 | 3/2001 | Yamashita | |
| 2004/0211614 A1* | 10/2004 | Matsuyama | 180/305 |
| 2009/0093340 A1 | 4/2009 | Higaki et al. | |

FOREIGN PATENT DOCUMENTS

| | | | |
|---|---|---|---|
| JP | 63-259182 A | | 10/1988 |
| JP | 5106245 | * | 10/1991 |
| JP | 2818474 B2 | | 8/1998 |
| JP | 2000-193086 A | | 7/2000 |
| JP | 2004-144264 A | | 5/2004 |
| WO | WO 2007/010991 A1 | | 1/2007 |

OTHER PUBLICATIONS

International Search Report dated Jun. 17, 2008 (two (2) pages).
Extended European Search Report dated Jan. 31, 2013 (six (6) pages).

* cited by examiner

Pf: WORKING CIRCUIT PRESSURE

Pf: WORKING CIRCUIT PRESSURE

Pf: WORKING MACHINE CIRCUIT PRESSURE (a)

(b)

TRAVEL CONTROL APPARATUS FOR WORKING VEHICLE

TECHNICAL FIELD

The present invention relates to a travel control apparatus for working vehicle that is driven by an HST (hydrostatic transmission) circuit achieved through a closed circuit connection of a variable displacement hydraulic pump and a variable displacement hydraulic motor.

BACKGROUND ART

Too great travel driving force of a working vehicle having an HST travel circuit and a work circuit, such as a wheel loader, reduces its lifting force of its lifting arm and thus causes the vehicle to have difficulty in lifting its bucket. In addition, when the bucket is thrust into the mound and lifted, tires skid, thereby reducing travel driving force and decreasing workability.

On the other hand, there are apparatuses known in the related art that limit the maximum displacement of a traveling hydraulic motor in correspondence to the discharge pressure of a working hydraulic pump so as to reduce travel driving force (refer to, for example, Patent Reference Literature #1). In the apparatus disclosed in Patent Reference Literature #1, the displacement of the motor is controlled according to a predetermined characteristic in which the maximum displacement of the traveling hydraulic motor gradually decreases with an increase in the discharge pressure of the working hydraulic pump.
Patent Reference Literature 1: Japanese Patent Publication No. 2818474 (FIG. 2)

DISCLOSURE OF THE INVENTION

Problems to be Solved by the Invention

In excavation work, in which a bucket is put into the mound such as the soil and then an arm is driven to lift the bucket, load pressure of the working hydraulic pump may often increase rapidly to near the maximum load pressure when the bucket is lifted up. However, since it takes time for the displacement of the traveling hydraulic motor to change in correspondence to load pressure, the change of the displacement volume can not follow the rapid change of the working load pressure. Accordingly, the travel driving force is not sufficiently reduced, thereby reducing workability.

Means for Solving the Problems

A travel control apparatus for working vehicle according to the present invention, comprises: a first circuit for traveling, formed through a closed circuit connection of a variable displacement hydraulic pump and a variable displacement hydraulic motor, that comprises a motor control unit that controls a displacement of the hydraulic motor; a second circuit for working that drives a work hydraulic actuator by pressure oil from a work hydraulic pump; and a maximum value control unit that controls a maximum displacement of the hydraulic motor in accordance with load pressure in the second circuit, wherein: the maximum value control unit decreases the maximum displacement to a minimum limit corresponding to a maximum load pressure in the second circuit when load pressure in the second circuit exceeds a predetermined value.

It may be possible that the work hydraulic actuator includes a bucket cylinder that drives a bucket and an arm cylinder that drives an arm for supporting a bucket; and that the predetermined value is set in advance to a maximum load pressure to be generated by drive of the bucket cylinder in advance.

There may be further provided a limit setting unit that manually sets the minimum limit.

It may be possible that the maximum value control unit decreases the maximum displacement to the minimum limit in a stepwise manner over a course of time when load pressure in the second circuit exceeds the predetermined value and drive pressure in the first circuit exceeds a predetermined value.

It may be also possible that the maximum value control unit decreases the maximum displacement to the minimum limit gradually over a course of time when load pressure in the second circuit exceeds the predetermined value and drive pressure in the first circuit exceeds a predetermined value.

In a case where load pressure in the second circuit exceeds the predetermined value, a rate of decrease of the maximum displacement may be set to be greater than a rate of decrease to be achieved in a case where load pressure in the second circuit does not exceed the predetermined value.

It may be possible that the maximum value control unit is configure to comprise: a first arithmetic circuit that calculates a first displacement of the hydraulic motor in correspondence to load pressure in the first circuit in accordance with a predetermined first characteristic; a second arithmetic circuit that calculates a second displacement of the hydraulic motor in correspondence to load pressure in the second circuit in accordance with a predetermined second characteristic; and an output circuit that outputs a control signal so as to control the maximum displacement to the calculated first displacement or the calculated second displacement, whichever is smaller, and that the second characteristic is set so that the second displacement decreases to the minimum limit when load pressure in the second circuit exceeds the predetermined value.

The second characteristic may be set so that the second displacement corresponds to a maximum value of the first characteristic in a range where load pressure in the second circuit is less than the predetermined value.

A maximum load pressure of the second circuit may be a relief pressure that is regulated by a relief valve.

Advantageous Effect of the Invention

According to the present invention, when load pressure in a work circuit exceeds a predetermined value, the maximum displacement of a hydraulic motor of a travel circuit is reduced to the minimum limit value. Therefore, even if the working load pressure rapidly increases to the maximum load pressure, the travel driving force does not become too great, thereby improving workability.

BEST MODE FOR CARRYING OUT THE INVENTION

The First Embodiment

The following is an explanation of the first embodiment of the travel control apparatus for working vehicle according to the present invention, given in reference to FIGS. 1~5.

Figure 1:
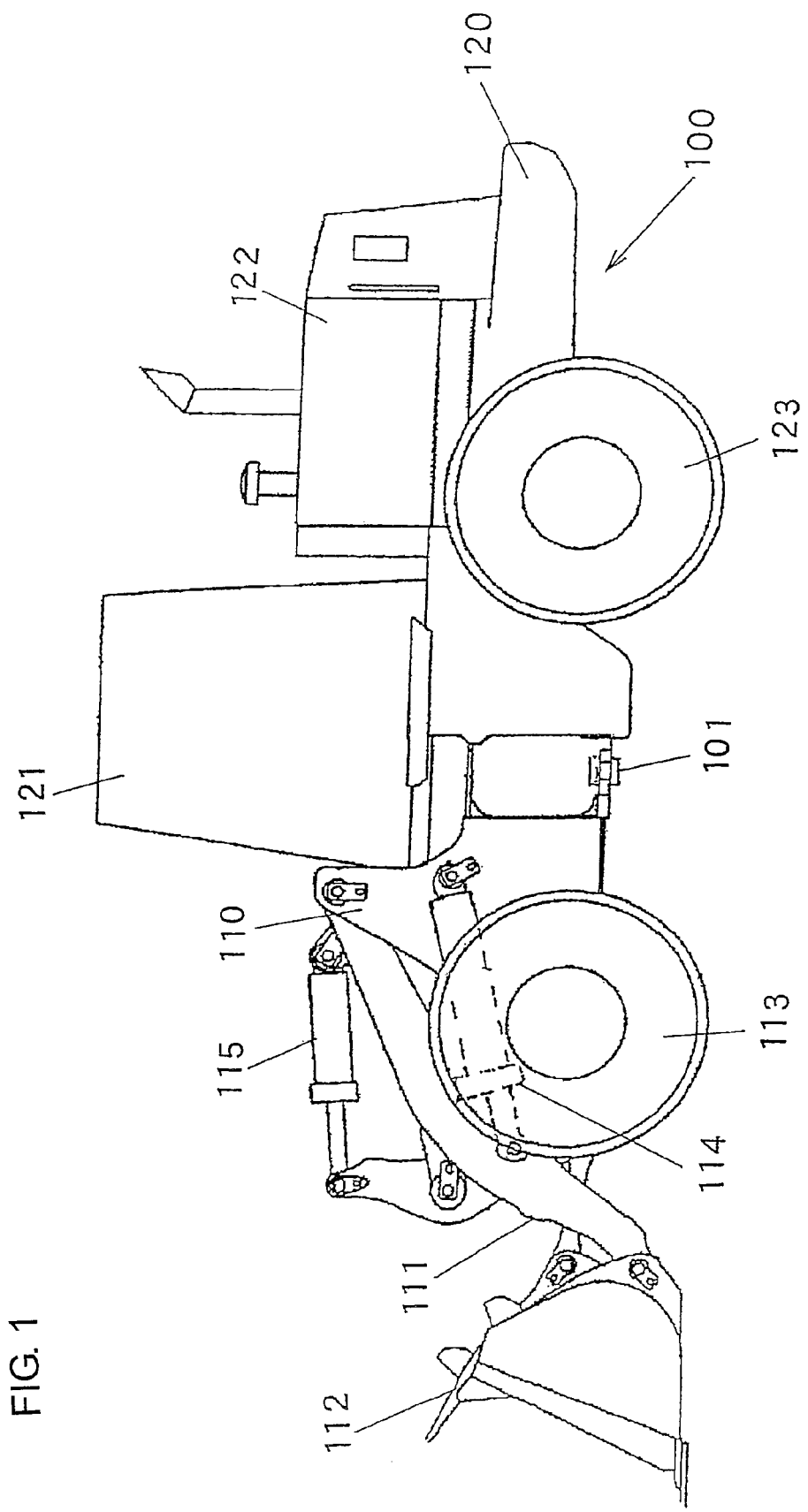
FIG. 1 A side view of a wheel loader that is an example of a working vehicle to which the travel control apparatus according to an embodiment of the present invention is applied.

FIG. 1 is a side view of a wheel loader that is an example of a working vehicle to which the travel control apparatus according to the present embodiment is applied. A wheel loader 100 is constituted by a front body 110 that includes an arm 111, a bucket 112, tires 113, and so on and a rear body 120 that includes a driver's cab 121, an engine room 122, tires 123, and so on. The arm 111 vertically rotates (moves up and down) by drive of an arm cylinder 114, whereas the bucket 112 vertically rotates (dumps or crowds) by drive of a bucket cylinder 115. The front body 110 and the rear body 120 are rotatably connected to each other by a center pin 101. Expansion and contraction of a steering cylinder (not figured herein) causes the front body 110 to move right and left relative to the rear body 120.

Figure 2:
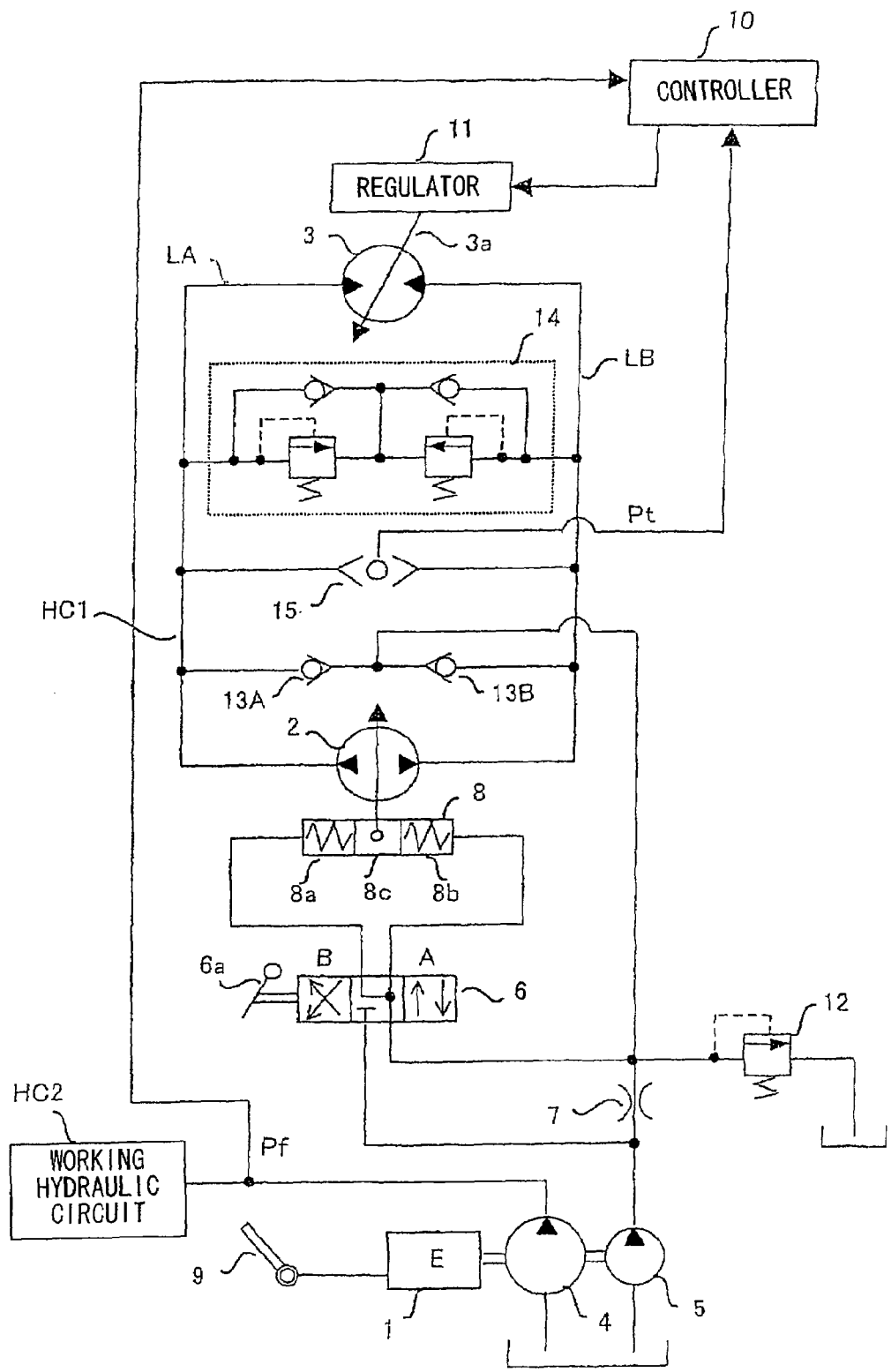
FIG. 2 A schematic structure of the travel control apparatus according to a first embodiment.

FIG. 2 shows a schematic structure of the travel control apparatus according to the first embodiment. A traveling hydraulic circuit HC1, including a variable displacement hydraulic pump 2 that is driven by an engine 1 and a variable displacement hydraulic motor 3 that is driven by pressure oil from the hydraulic pump 2, is constituted by an HST circuit achieved through a closed circuit of the hydraulic pump 2 and the hydraulic motor 3 connected through a pair of main pipelines LA and LB. A working hydraulic circuit HC2 includes the arm cylinder 114 and the bucket cylinder 115 to which pressure oil is supplied from a working hydraulic pump 4 driven by the engine 1. The upper pressure of the working hydraulic circuit HC2 is limited to a relief pressure Pr by a relief valve.

Pressure oil is guided from a charge pump 5 driven by the engine 1 to a displacement cylinder 8 through a forward/reverse switching valve 6. The forward/reverse switching valve 6 is operated by an operation lever 6a. As illustrated, when the forward/reverse switching valve 6 is in a neutral position, pressure oil is applied from the charge pump 5 to oil chambers 8a and 8b of the displacement cylinder 8 through a restrictor 7 and the forward/reverse switching valve 6. In this state, pressures applied to the oil chambers 8a and 8b are equal to each other, and a piston 8c is in a neutral position. Therefore, the displacement of the hydraulic pump 2 becomes equal to zero, and the pump discharge amount is zero.

When the forward/reverse switching valve 6 is switched to an A position, the upstream pressure and the downstream pressure of the restrictor 7 apply to the oil chambers 8a and 8b, respectively. Therefore, a pressure difference is caused in the oil chambers 8a and 8b of the cylinder 8, and the piston 8c is displaced rightward as indicated in FIG. 2. This causes the pump displacement of the hydraulic pump 2 to increase, pressure oil from the hydraulic pump 2 to be guided to the hydraulic motor 3 through the main pipeline LA, the hydraulic motor 3 to rotate forward, and the vehicle to travel forward. When the forward/reverse switching valve 6 is switched to a B position, the piston 8c of the displacement cylinder 8 is displaced leftward as indicated in FIG. 2. This causes pressure oil from the hydraulic pump 2 to be guided to the hydraulic motor 3 through the main pipeline LB, and the hydraulic motor 3 to rotate backward.

The engine rotation speed is adjusted by an accelerator pedal 9, and the discharge amount of the charge pump 5 is proportional to the engine rotation speed. Accordingly, the differential pressure between upstream and downstream of the restrictor 7 is proportional to the engine rotation speed and the pump displacement of the hydraulic pump 2 is also proportional to the engine rotation speed. It is to be noted that pressure oil from the charge pump 5 flows through the restrictor 7 and check valves 13A and 13B and is guided to the main pipelines LA and LB. The downstream pressure of the restrictor 7 is limited by the charge relief valve 12, whereas the maximum pressure in the main pipelines LA and LB is limited by the relief valve 14.

The pressure in the main pipelines LA and LB selected by a high-pressure selection valve 15 is input to a controller 10 as a travel circuit pressure Pt, and the discharge pressure of the work pump 4 is input to the controller 10 as a working circuit pressure Pf. The controller 10 includes a processing unit including a CPU, a ROM, a RAM, another peripheral circuit, and so on. The CPU executes following processing so as to output a control signal to an electric regulator 11. In response to the control signal, the regulator 11 drives a displacement control lever 3a so as to control the displacement (the motor displacement) of the hydraulic motor 3 between the minimum displacement qmin and the maximum displacement qmax.

Figure 3:
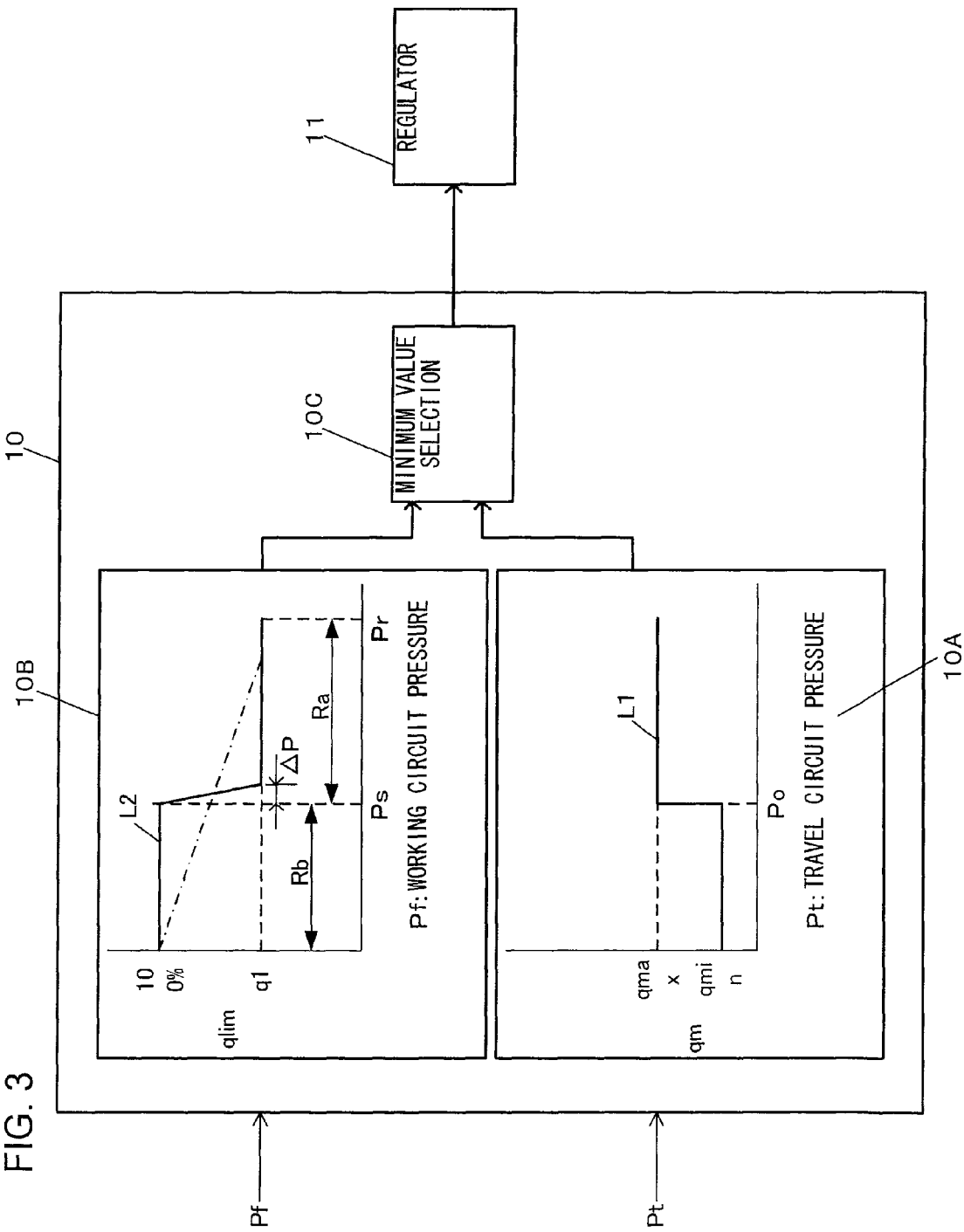
FIG. 3 A block diagram of the structure of the controller in FIG. 1.

FIG. 3 is a block diagram of the processing executed in the controller 10. The travel circuit pressure Pt is input to a function generator 10A. A characteristic L1 is set in advance for the function generator 10A as shown, and according to the characteristic L1, a target displacement qm (the target displacement volume) is calculated in correspondence to the travel circuit pressure Pt. According to the characteristic L1, the target displacement qm is the minimum displacement qmin when the travel circuit pressure Pt is less than a predetermined value P0, whereas the target displacement qm increases from the minimum displacement qmin to the maximum displacement qmax when the travel circuit pressure Pt is equal to the predetermined value P0, and the target displacement qm becomes equal to the maximum displacement qmax when the travel circuit pressure Pt exceeds the predetermined value P0. The product of the travel circuit pressure Pt (more accurately, the differential pressure between the main pipelines LA and LB) and the motor displacement corresponds to output torque of the hydraulic motor 3. In this manner, the hydraulic motor 3 outputs drive torque in correspondence to the load so as to achieve the travel driving force for the vehicle.

The working circuit pressure Pf is input to a function generator 10B. A characteristic L2 is set in advance for the function generator 10B as shown. In accordance with the characteristic L2, the upper limit qlim of the motor displacement is calculated in correspondence to the working circuit pressure Pf. The vertical axis of the function generator 10B in which the characteristic L2 is set indicates the proportion of the characteristic L1 to the motor maximum displacement qmax. According to the characteristic L2, the upper limit qlim of the motor displacement is equal to the maximum displacement qmax (100%) before the working circuit pressure Pf reaches a predetermined value Ps, whereas the upper limit qlim decreases linearly to the predetermined value q1 in a range of ΔP when the working circuit pressure Pf reaches the predetermined value Ps, and the upper limit qlim becomes equal to the predetermined value q1 when the working circuit pressure Pf is equal to or greater than Ps+ΔP.

The predetermined value q1 corresponds to a motor displacement that can exert travel driving force which is balanced with the working load when the working circuit pressure Pf is equal to the maximum load pressure Pr (relief pressure). More specifically, if the motor maximum displacement is regulated to be equal to or less than the predetermined value q1 when the working circuit pressure Pf is equal to the maximum load pressure Pr, travel driving force becomes optimal to the lifting force of the arm 111. In this state, the tires can be prevented from skidding, thereby achieving an appropriate excavation work.

When the bucket 112 is thrust into the soil, the arm 111 is subjected to the reaction force from the soil. If the motor maximum displacement is equal to or less than the predetermined value q1 at the maximum load pressure Pr, the travel driving force is restricted so that the reaction force applied to the arm 111 does not become too great. In this manner, the arm 111 can be easily lifted by lever operation. It is to be noted that q1, greater than the minimum displacement qmin, is set in advance to, for instance, approximately 50 to 70% of the maximum displacement qmax. ΔP is set for the purpose of control stability, and it may be set to zero. The below explanation assumes that ΔP is zero for simplicity.

Figure 4:
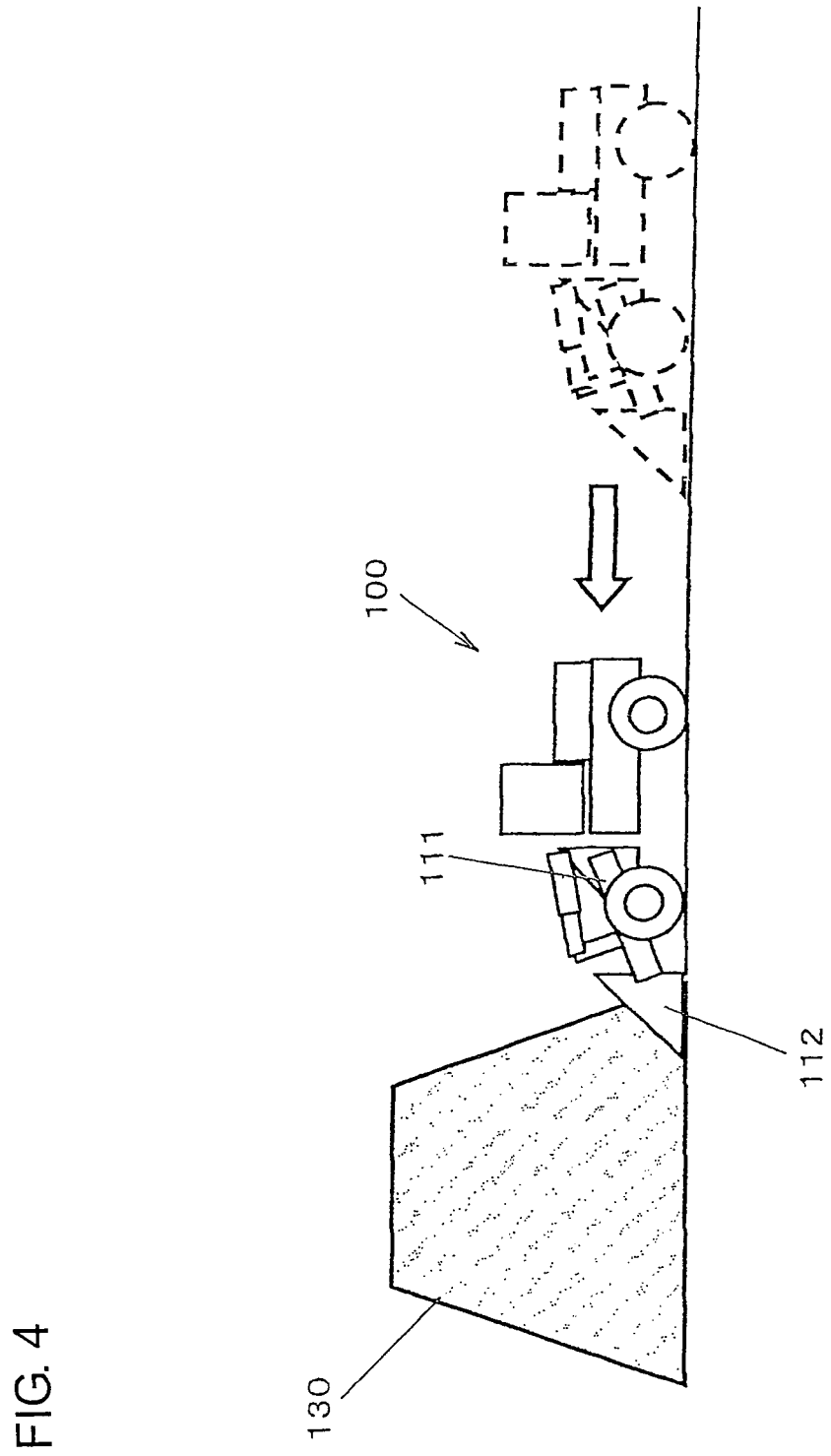
FIG. 4 A figure illustrating an operation of excavation work by the wheel loader.

As FIG. 4 shows, after thrusting the bucket 112 into a mound 130, which is the soil or the like, the wheel loader 100 generally operates the bucket 112 before lifting the arm 111, or operates the bucket 112 and the arm 111 at the same time before lifting the arm 111 alone. In this kind of excavation work, load pressure at bucket operation usually is less than load pressure at arm operation. For example, by indicating a region (bucket operation range) in which the working circuit pressure Pf varies during the bucket operation and a region (arm operation range) in which the working circuit pressure Pf varies during the arm operation with Rb and Ra, respectively, as the function generator 10B in FIG. 3 shows, a region in which the working circuit pressure Pf is low is the bucket operation range Rb and a region in which the working circuit pressure Pf is high is the arm operation range Ra.

The present embodiment assumes the predetermined value Ps of the characteristic L2 being set near the maximum value of the bucket operation range Rb. The minimum value of the arm operation range Ra is substantially equal to the maximum value of the bucket operation range Rb, i.e., the predetermined value Ps, whereas the maximum value of the arm operation range Ra is equal to the relief pressure Pr. It is to be noted that although Ps does not always mark the border between Ra and Rb because the arm operation range Ra and the bucket operation range Rb vary in correspondence to the specific gravity of excavated material, the present embodiment assumes the predetermined value Ps being set for the border between Ra and Rb using typical values of Ra and Rb.

The target displacement qm calculated by the function generator 10A and the upper limit qlim of the motor displacement calculated by the function generator 10B are each input to a minimum value selection circuit 10C. The minimum value selection circuit 10C selects qm or qlim, whichever is smaller, and outputs it to the regulator 11 as a target displacement qm. This causes the maximum value of the motor displacement to be limited to the upper limit qlim.

Operations of the travel control apparatus according to the present embodiment are summarized as follows.

In excavation work, as FIG. 4 shows, the wheel loader 100 moves toward the mound 130 and the bucket cylinder 115 is operated so as to take the soil or the like in the bucket 112. At this time, since the working circuit pressure Pf is usually equal to or less than the predetermined value Ps, the upper limit qlim of the motor displacement becomes equal to the maximum displacement qmax, thereby exerting the maximum travel driving force. This enables the bucket 112 to be thrust into the soil with great force so as to take the soil in the bucket 112 without difficulty.

Next, either the arm cylinder 114 alone is operated or the arm cylinder 114 and the bucket cylinder 115 are operated in combination so as to lift the bucket 112. The working circuit pressure Pf increases more at arm lifting operation than at bucket operation, and, when the working circuit pressure Pf becomes equal to or greater than the predetermined value Ps, the upper limit qlim of the motor displacement rapidly decreases to the predetermined value q1. In this state, even if at arm operation the working circuit pressure Pf rapidly increases to near the relief pressure Pr, the motor maximum displacement is reduced to be equal to or less than the predetermined value q1. This prevents travel driving force from becoming too great at arm lifting operation, and allows arm lifting force and travel driving force to balance well with each other. As a result, the bucket 112 can be lifted without difficulty, thereby increasing working efficiency.

Figure 5:
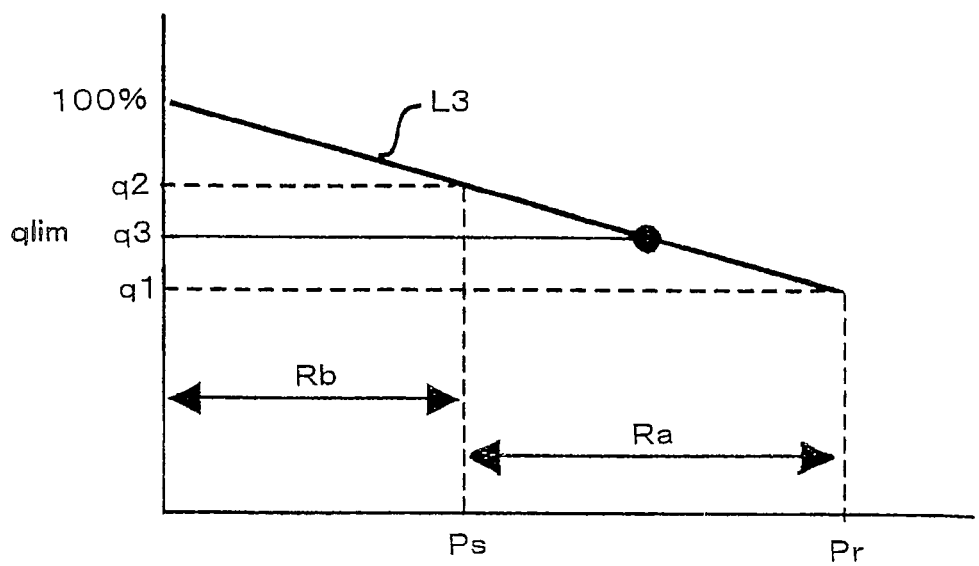
FIG. 5 A characteristic of the motor displacement contrasted with FIG. 3.

In contrast, for instance as a characteristic L3 in FIG. 5 shows, if the upper limit qlim of the motor displacement is gradually decreased with an increase in the working circuit pressure Pf, q1 is output as the upper limit qlim of the motor displacement when the working circuit pressure Pf rapidly increases from Ps to Pr at arm operation. However, in the event that the motor displacement actually changes, there is usually a 0.2 to 0.8 second response delay depending upon the structure and size of the hydraulic motor. Therefore, the motor displacement can not follow the change in the working circuit pressure Pf, travel driving force does not immediately decrease. This causes the travel driving force to become too great and makes it difficult to immediately lift the bucket 112. For this reason, the bucket cylinder 115 and the like need to be operated and the reaction force applied to the arm 111 needs to be reduced so as to lift the bucket 112, thereby making the operation complicated. In addition, in the case where the working circuit pressure Pf fluctuates between Ps and Pr at arm operation, the motor displacement can not follow the working circuit pressure Pf. In this case, since the upper limit qlim of the motor displacement becomes equal to, for instance, the mean q3 of q1 and q2, and the travel driving force is not sufficiently reduced, lifting the bucket 112 requires a complicated operation as described above.

According to the first embodiment, the following operational effects can be achieved.

(1) When the working circuit pressure Pf becomes equal to or greater than the predetermined value Ps, the maximum value of the motor displacement is decreased linearly from qmax to q1. This prevents travel driving force from becoming too great even if the working circuit pressure Pf rapidly increases to near the relief pressure Pr at arm operation, so that arm lifting force and travel driving force balance with each other, thereby enabling the bucket 112 to be lifted without difficulty.

(2) When the working circuit pressure Pf is equal to or less than the predetermined value Ps, the maximum value of the motor displacement is set to qmax (100%). This allows the maximum travel driving force to be exerted, and allows the sufficient soil or the like to be taken in the bucket.

(3) The predetermined value Ps is set for the maximum value of the bucket operation range Rb. This allows bucket operation that requires great travel driving force and arm operation that does not require great travel driving force each to be performed without difficulty, thereby enabling the wheel loader to perform excavation work efficiently.

The Second Embodiment

Figure 6:
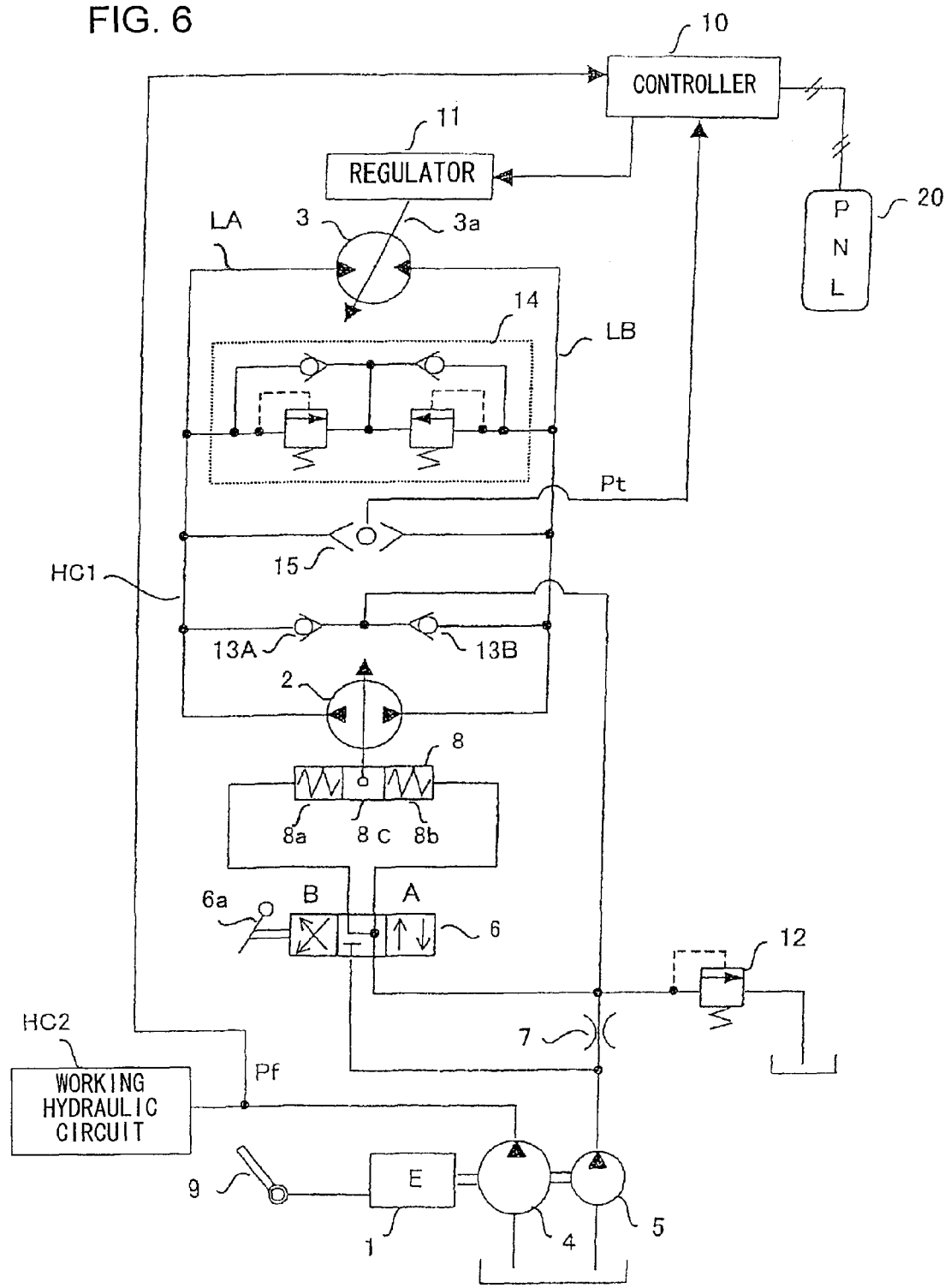
FIG. 6 An outline structure of the travel control apparatus according to a second embodiment.
Figure 7:
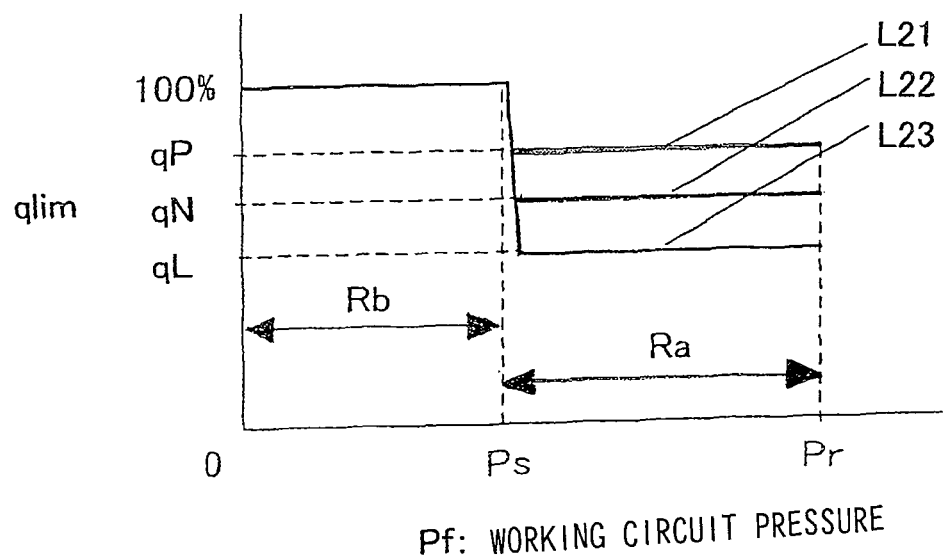
FIG. 7 A characteristic of the upper limit of the motor displacement achieved in the second embodiment.

The second embodiment of the travel control apparatus for working vehicle according to the present invention is explained, given in reference to FIGS. 6 and 7.

In the first embodiment, when the working circuit pressure Pf becomes equal to or greater than the predetermined value Ps, the upper limit of the motor displacement is reduced to the predetermined value q1. On the other hand, in the second embodiment, the predetermined value q1 is variable. It is to be noted that the following explanation focuses on the difference from the first embodiment.

FIG. 6 is a schematic structure of the travel control apparatus according to the second embodiment. It is to be noted that the same reference numerals are assigned to components identical to those in FIG. 2. As FIG. 6 shows, in addition to the travel circuit pressure Pt and the working circuit pressure Pf, a signal from a change-over switch 20 is input to the controller 10. The change-over switch 20 is a manual switch that changes over the magnitude of travel driving force at excavation to three modes, that is, P mode, N mode, and L mode, which is to be operated as necessary by the operator depending upon the type of excavation material, the road surface condition, and so on. It is to be noted that the change-over switch 20 may be configured to be changed over in two modes, four modes, or more.

As FIG. 7 shows, the function generator 10B according to the second embodiment has a plurality of characteristics L21 to L23 having been set in correspondence to the P mode, N mode, and L mode, respectively. Before the working circuit pressure Pf reaches the predetermined value Ps, in each of the characteristics L21 to L23, the upper limit qlim of the motor displacement is equal to the maximum displacement qmax (100%). On the other hand, in the range where the working circuit pressure Pf is greater than the predetermined value Ps, the upper limit qlim of the motor displacement of the characteristic L21 (P mode) is set to a predetermined value qp, the upper limit qlim of the motor displacement of the characteristic L22 (N mode) is set to a predetermined value qN, and the upper limit qlim of the motor displacement of the characteristic L23 (L mode) is set to a predetermined value qL. The predetermined values qP, qN, and qL have a relationship expressed by qP>qN>qL.

In the second embodiment, the operator determines the type of excavation material, the road surface condition, and so on, and operates the change-over switch 20 so as to select the mode. For instance, P mode is selected if the excavation material is hard such as crushed stones or the like. This realizes travel driving force greater than that in the case where another mode is selected because the motor displacement is relatively great even when a working load pressure P is equal to or greater than the predetermined value Ps, thereby achieving an efficient operation. On the other hand, L mode is selected in the event that the excavation material is soft such as sand, snow, or the like. This realizes travel driving force smaller than that in the case where another mode is selected when the working load pressure P is equal to or greater than the predetermined value Ps, thereby achieving an efficient operation without skidding the tires.

Thus, in the second embodiment, the upper limit qlim of the motor displacement can be changed as necessary when the working circuit pressure Pf is equal to or greater than the predetermined value Ps. This facilitates balance adjustment of arm lifting force with travel driving force in excavation work, and thus increases working efficiency of excavation work regardless of the type of excavation material, the road surface condition, and so on.

The Third Embodiment

The third embodiment of the travel control apparatus for working vehicle according to the present invention is explained, given in reference to FIGS. 8 to 11.

In the first embodiment, the upper limit of the motor displacement is reduced on the condition that the working circuit pressure Pf is equal to or greater than the predetermined value Ps. On the other hand, in the third embodiment, the upper limit of the motor displacement is reduced on the condition that the working circuit pressure Pf is equal to or greater than the predetermined value Ps and the travel circuit pressure Pt is equal to or greater than a predetermined value Pts. It is to be noted that the following explanation focuses on the difference from the first embodiment.

Figure 8:
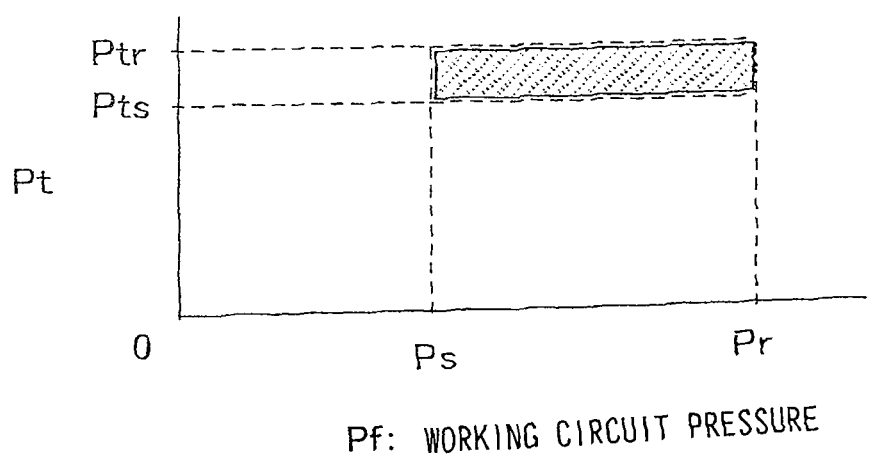
FIG. 8 A predetermined control region achieved in a third embodiment.
Figure 9:
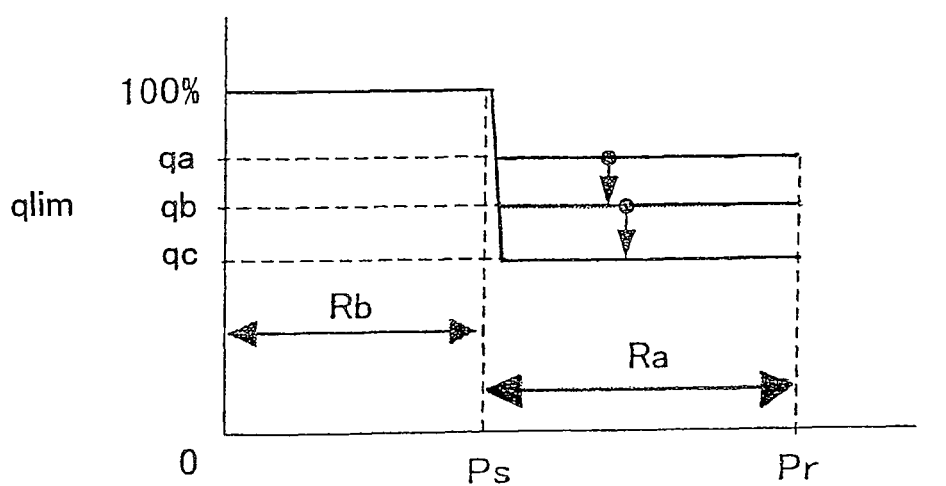
FIG. 9 A characteristic of the upper limit of the motor displacement achieved in the third embodiment.

A hatched region in FIG. 8 indicates an excavation work region in which the working circuit pressure Pf is equal to or greater than the predetermined value Ps and the travel circuit pressure Pt is equal to or greater than the predetermined value Pts. The controller 10 makes a decision as to whether or not the working circuit pressure Pf is equal to or greater than the predetermined value Ps and whether or not the travel circuit pressure Pt is equal to or greater than the predetermined value Pts, in other words, whether or not an excavation work state is entered. In addition, the controller 10 makes a decision as to a duration time t in an excavation work state so as to decrease the upper limit qlim of the motor displacement in a stepwise manner with an increase in the duration time t as qa→qb→qc, for instance, as shown in FIG. 9.

Figure 10:
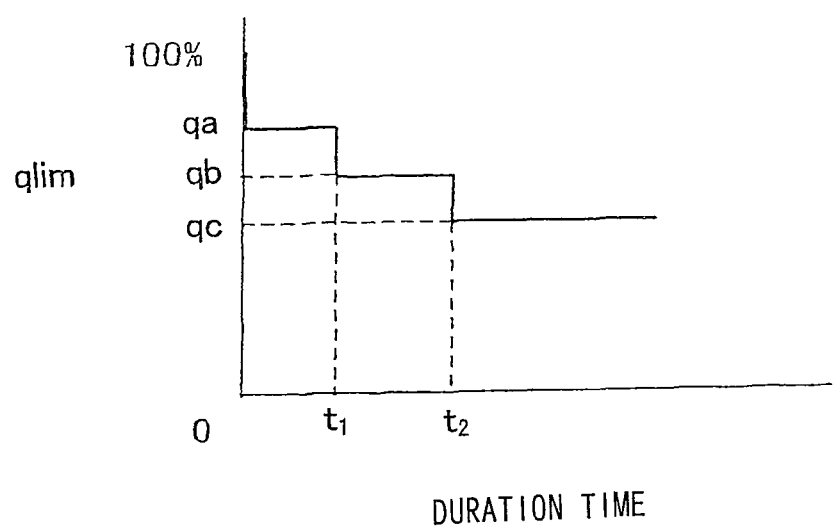
FIG. 10 A figure presenting the characteristic in FIG. 9 in relation to duration time.

The relationship between the duration time t and the upper limit of the motor displacement is shown in FIG. 10. In FIG. 10, the upper limit qlim is equal to the predetermined value qa before the duration time t reaches a predetermined time t1, the upper limit qlim becomes equal to the predetermined value qb when the duration time t is equal to or greater than the predetermined time t1 and less than a predetermined time t2, and the upper limit qlim is equal to the predetermined value qc when the duration time t is equal to or greater than the predetermined time t2. It is to be noted that the predetermined value qc corresponds to the predetermined value q1 in the first embodiment. It is acceptable that the predetermined value qc is not a fixed value but variable upon mode selection or the like.

Thus, since in the third embodiment, the upper limit qlim of the motor displacement is decreased in a stepwise manner with an increase in the duration time t of the excavation work, the arm lifting force and the travel driving force can be appropriately balanced over the course of time. Accordingly, unlike in the second embodiment, in which the operator selects the mode, in the third embodiment the relationship between the arm lifting force and the travel driving force becomes optimal in accordance with the type of excavation material, the road surface condition, and so on and an issue that the travel driving force is too great for the bucket to be lifted can be resolved.

Figure 11:
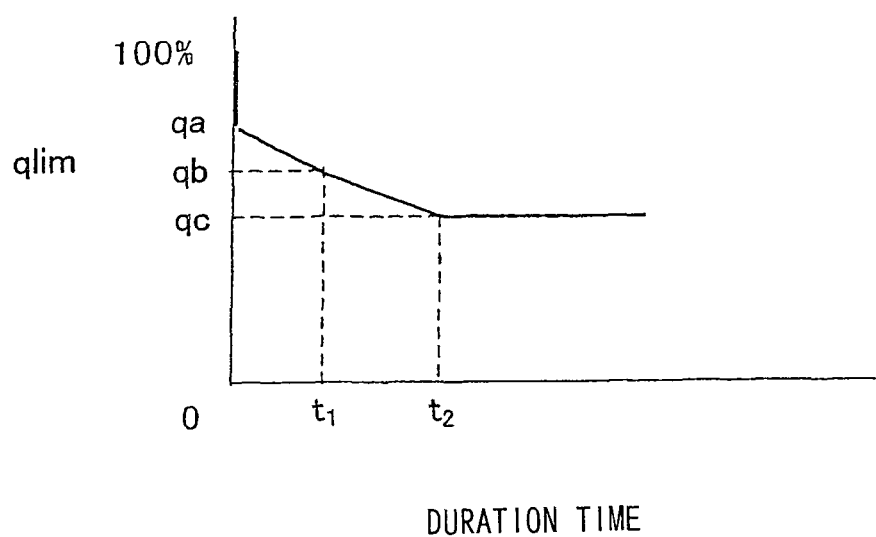
FIG. 11 A variation of the characteristic in FIG. 10.

It is to be noted that the upper limit qlim of the motor displacement may be gradually decreased in place of being decreased in a stepwise manner over the course of time. An example thereof is shown in FIG. 11. In FIG. 11, the upper limit qlim of the motor displacement is proportionally decreased from qa to qb until the duration time t in an excavation work state reaches the predetermined time t1, then, the upper limit qlim is proportionally decreased from qb to qc until the duration time t reaches the predetermined time t2, and the upper limit qlim is set to qc when the duration time t is equal to or greater than the predetermined time t2. Thus the upper limit qlim of the motor displacement is gradually decreased over the course of time so as to prevent the motor displacement from changing abruptly, thereby achieving a smooth excavation work.

Although in the above embodiments a threshold Ps of the working circuit pressure Pf is a fixed value, Ps may be variable. Although a first circuit is formed as the travel circuit HC1, which is achieved through a closed circuit connection of the hydraulic pump 2 and the hydraulic motor 3, and a second circuit is formed as the working circuit HC2, which guides pressure oil from the hydraulic pump 4 to the cylinders 114 and 115 and the like, the circuit structures are not limited to those described above. For example, although the hydraulic pumps 2 and 4 are driven by the same engine 1, they may be driven by separate engines. Although the travel circuit HC1 is configured by combining one motor per one pump, the circuit may be configured by a plurality of motors. Although the target displacement qm is output from the function generator 10A and, in correspondence to the target displacement qm, the regulator 11 is driven so as to control the motor displacement, the structure of a motor control unit is not limited to such structure. For instance, the regulator 11 may be configured as a hydraulic regulator in place of an electric regulator.

The characteristic L2 representing the upper limit qlim of the motor displacement in correspondence to the working circuit pressure Pf is set in the function generator circuit 10B so as to limit the maximum value of the motor displacement in accordance with the characteristic L2. However, as long as the maximum value of the motor displacement is decreased to the minimum limit q1 in correspondence to the maximum load pressure (the relief pressure Pr) when the working circuit pressure Pf exceeds the predetermined value Ps, any characteristic is acceptable for the characteristic L2, and the structure of a maximum value limit unit is not limited to that described above.

Figure 12:
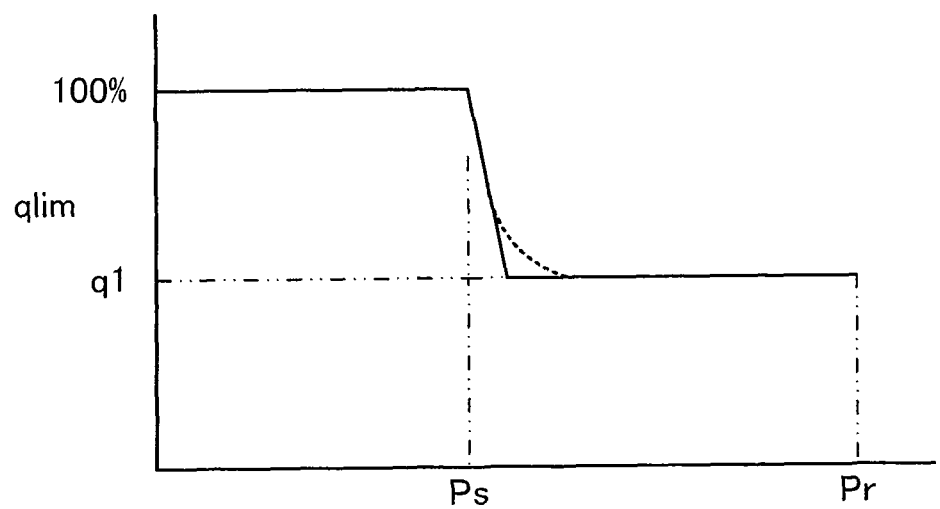
FIG. 12 Other characteristics of the upper limit of the motor displacement.
Figure 12:
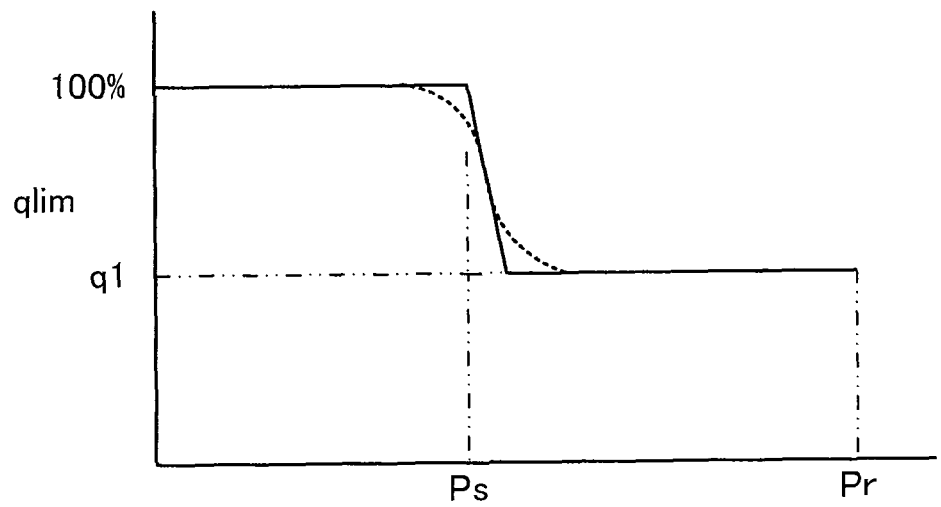

For instance, the upper limit qlim of the motor displacement may be gradually decreased until the working circuit pressure Pf reaches the predetermined value Ps, and the upper limit qlim of the motor displacement may be rapidly decreased to q1 when the working circuit pressure Pf exceeds the predetermined value Ps. In other words, the rate of decrease of the upper limit qlim of the motor displacement in the case where the working circuit pressure Pf exceeds the predetermined value Ps may be greater than the rate of decrease in the case where the working circuit pressure Pf does not exceed the predetermined value Ps. As shown by a dotted line in FIG. 12 (a), a characteristic in which the upper limit qlim of the motor displacement smoothly decreases when the working circuit pressure Pf exceeds the predetermined value Ps is acceptable. As shown by a dotted line in FIG. 12 (b), a characteristic in which the upper limit qlim of the motor displacement smoothly decreases when the working circuit pressure Pf approaches the predetermined value Pa is acceptable. These characteristics reduce the shock during operation.

A cut-off valve may be provided in the working hydraulic circuit HC2 so as to cut off the upper limit of the working circuit pressure Pf before reaching the relief pressure Pr. In this case, when the working circuit pressure Pf exceeds the predetermined value Ps, the maximum value of the motor displacement may be decreased to the minimum limit in correspondence to a cut-off pressure Pr. Although the change-over switch 20 is operated so as to set the upper limit qlim of the motor displacement (FIG. 6), any limit setting unit is acceptable.

In the controller 10 (FIG. 3), the function generator 10A, which serves as a first arithmetic circuit, calculates the motor displacement m (a first displacement) in correspondence to the load pressure Pt in the traveling hydraulic circuit HC1 in accordance with the predetermined characteristic L1 (a first characteristic). The function generator 10B, which serves as a second arithmetic circuit, calculates the motor displacement qlim (a second displacement) in correspondence to the load pressure Pf in the working hydraulic circuit HC2 in accordance with the predetermined characteristic L2 (a second characteristic). In addition, the minimum value selection circuit 100, which serves as an output circuit, outputs a control signal so as to limit the maximum value of the motor displacement to the calculated motor displacement qm or qlim, whichever is smaller. However, processing by the controller 10 is not limited to those described above.

While an explanation is given above on an example in which the travel motion control apparatus of the present invention is adopted in a wheel loader, the present invention may also be adopted in other types of working vehicles. Namely, as long as the features and functions of the present invention are realized effectively, the present invention is not limited to the travel control apparatus achieved in the embodiments.

The disclosure of the following priority application is herein incorporated by reference:

Japanese Patent Application No. 2007-61954 (filed on Mar. 12, 2007)

The invention claimed is:

1. A travel control apparatus for working vehicle, comprising:
　a first circuit for traveling, formed through a closed circuit connection of a variable displacement hydraulic pump and a variable displacement hydraulic motor, that comprises a motor control unit that controls a displacement of the hydraulic motor;
　a second circuit for working that drives a work hydraulic actuator by pressure oil from a work hydraulic pump, the work hydraulic actuator comprising:
　　an arm cylinder that drives an arm for supporting a bucket and has an arm operation pressure range in which a pressure in the second circuit varies during an arm operation and a maximum load pressure in the second circuit is set as a maximum pressure of the arm operation pressure range, and
　　a bucket cylinder that drives the bucket and has a bucket operation pressure range in which a pressure in the second circuit varies during a bucket operation, the pressure in the second circuit being smaller than a pressure in the arm operation pressure range, and a pressure around a minimum pressure of the arm operation pressure range is set as a maximum pressure of the bucket operation pressure range; and
　a maximum value control unit that controls a maximum displacement of the hydraulic motor in accordance with load pressure in the second circuit, wherein:

when a load pressure in the second circuit exceeds a first predetermined value that corresponds to the maximum pressure of the bucket operation pressure range, the maximum value control unit decreases the maximum displacement to a minimum limit corresponding to a maximum load pressure in the second circuit within a predetermined increment of the load pressure from the first predetermined value, the load pressure with the predetermined increment being smaller than the maximum load pressure in the second circuit.

2. A travel control apparatus for working vehicle according to claim 1, further comprising:
   a limit setting unit that manually sets the minimum limit.

3. A travel control apparatus for working vehicle according to claim 1, wherein:
   the maximum value control unit decreases the maximum displacement to the minimum limit in a stepwise manner over a course of time when load pressure in the second circuit exceeds the first predetermined value and drive pressure in the first circuit exceeds a second predetermined value.

4. A travel control apparatus for working vehicle according to claim 1, wherein:
   the maximum value control unit decreases the maximum displacement to the minimum limit gradually over a course of time when load pressure in the second circuit exceeds the first predetermined value and drive pressure in the first circuit exceeds a second predetermined value.

5. A travel control apparatus for working vehicle according to claim 1, wherein:
   in a case where load pressure in the second circuit exceeds the first predetermined value, the maximum value control unit sets a rate of decrease of the maximum displacement to be greater than a rate of decrease to be achieved in a case where load pressure in the second circuit does not exceed the first predetermined value.

6. A travel control apparatus for working vehicle according to claim 1, wherein:
   the maximum value control unit comprises:
      a first arithmetic circuit that calculates a first displacement of the hydraulic motor in correspondence to load pressure in the first circuit in accordance with a predetermined first characteristic;
      a second arithmetic circuit that calculates a second displacement of the hydraulic motor in correspondence to load pressure in the second circuit in accordance with a predetermined second characteristic; and
      an output circuit that outputs a control signal so as to control the maximum displacement to the calculated first displacement or the calculated second displacement, whichever is smaller, wherein:
   the second characteristic is set so that the second displacement decreases to the minimum limit when load pressure in the second circuit exceeds the first predetermined value.

7. A travel control apparatus for working vehicle according to claim 6, wherein:
   the second characteristic is set so that the second displacement corresponds to a maximum value of the first characteristic in a range where load pressure in the second circuit is less than the first predetermined value.

8. A travel control apparatus for working vehicle according to claim 1, wherein:
   a maximum load pressure of the second circuit is a relief pressure that is regulated by a relief valve.

* * * * *